United States Patent
Hahn

(10) Patent No.: US 11,312,318 B2
(45) Date of Patent: Apr. 26, 2022

(54) CLADDING DEVICE FOR A SIDE SILL OF A PASSENGER VEHICLE AND METHOD FOR OPERATING SUCH A CLADDING DEVICE

(71) Applicant: Daimler AG, Stuttgart (DE)

(72) Inventor: Samuel Hahn, Boeblingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/980,091

(22) PCT Filed: Dec. 4, 2018

(86) PCT No.: PCT/EP2018/083408
§ 371 (c)(1),
(2) Date: Sep. 11, 2020

(87) PCT Pub. No.: WO2019/174767
PCT Pub. Date: Sep. 19, 2019

(65) Prior Publication Data
US 2021/0024014 A1    Jan. 28, 2021

(30) Foreign Application Priority Data
Mar. 13, 2018 (DE) ...................... 10 2018 001 993.5

(51) Int. Cl.
*B60R 13/04* (2006.01)
*B62D 25/02* (2006.01)
*B62D 35/00* (2006.01)

(52) U.S. Cl.
CPC ............ *B60R 13/04* (2013.01); *B62D 25/025* (2013.01); *B60R 13/043* (2013.01); *B60R 2013/046* (2013.01); *B62D 35/008* (2013.01)

(58) Field of Classification Search
CPC ..... B60R 13/04; B60R 13/043; B62D 25/025; B62D 35/02; B62D 35/008
(Continued)

(56) References Cited

U.S. PATENT DOCUMENTS

2007/0152475 A1* 7/2007 Harrison ................ B62D 37/02
296/209

FOREIGN PATENT DOCUMENTS

DE    36 13 301 A1    10/1987
DE    42 09 164 A1    9/1993
(Continued)

OTHER PUBLICATIONS

PCT/EP2018/083408, International Search Report dated Jan. 31. 2019 (Two (2) pages).

*Primary Examiner* — Dennis H Pedder
(74) *Attorney, Agent, or Firm* — Crowell & Moring LLP

(57) ABSTRACT

A cladding device of a side sill of a passenger vehicle includes an inherently rigid outer cladding element arranged in a longitudinal region of the side sill below a door opening which can be displaced between a cladding position and a release position. A flexible cladding element is provided, one end of which is arranged on the inherently rigid outer cladding element, which can be displaced with the inherently rigid outer cladding element during a displacement movement between the cladding position and the release position. The flexible cladding element is arranged in a region of the side sill covered by a vehicle door associated with the door opening when the inherently rigid outer cladding element is arranged in the cladding position. In the cladding position, a gap is covered between the end of the inherently rigid outer cladding element, which has the flexible cladding element, and another component.

10 Claims, 3 Drawing Sheets

(58) Field of Classification Search
USPC .......................... 296/209, 1.08, 180.1, 180.5
See application file for complete search history.

(56) References Cited

FOREIGN PATENT DOCUMENTS

DE  10 2009 031 534 A1   2/2010
DE  10 2012 018 284 A1   3/2013
DE  10 2017 001 662 A1   8/2017
DE       2017001303    * 12/2017

* cited by examiner

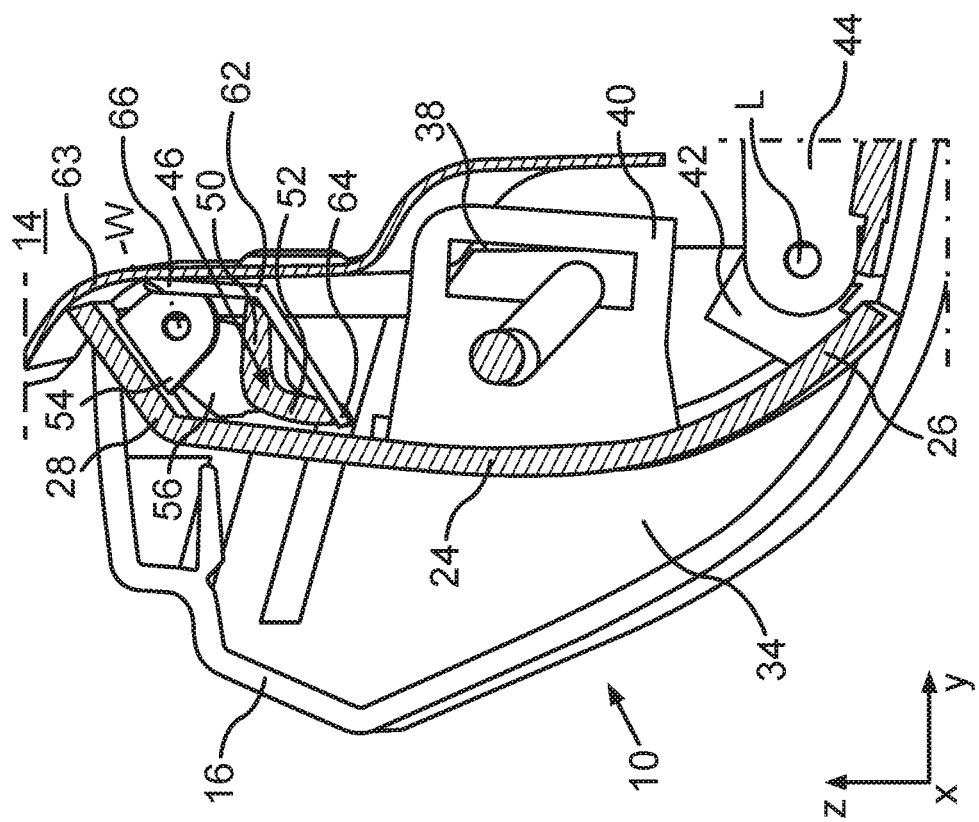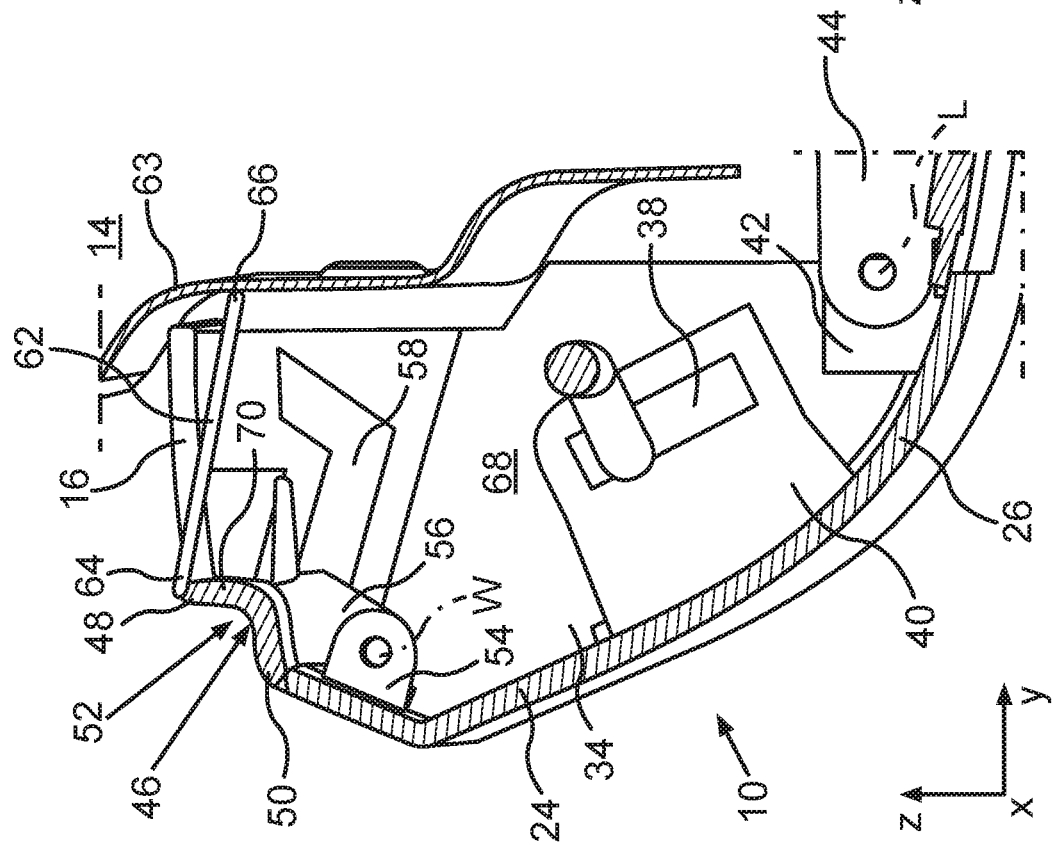

CLADDING DEVICE FOR A SIDE SILL OF A PASSENGER VEHICLE AND METHOD FOR OPERATING SUCH A CLADDING DEVICE

BACKGROUND AND SUMMARY OF THE INVENTION

The invention relates to a cladding device for a side sill of a passenger vehicle. Furthermore, the invention relates to a method for operating such a cladding device.

In the case of side sills of passenger vehicles, the problem generally arises that, in the region below a door opening, an outer sill cladding should be provided which projects outwards beyond the lower edge of the door in the transverse direction of the vehicle or at least is flush with it. Such an extension of the respective sill cladding is necessary in order to protect the side door and in particular the lower edge of the door against stone chipping and dirt from below.

However, the described desirable extension of the sill cladding in the transverse direction of the vehicle to the outside raises the problem in the region of the respective door opening that constantly increasing demands on the ergonomics and comfort of vehicles, in particular with regard to ease of entry and exit, are considerably counteracted. When getting into and out of the vehicle, this leads to the sill cladding underneath the door opening getting in the way of the legs of the respective passenger, which can lead to reduced comfort, in particular for older people or people with reduced mobility. This problem is also aggravated, for example, if the vehicle door cannot be opened wide in tight parking spaces.

It is already known from the generic DE 10 2009 031 534 A1 that an inherently rigid external cladding element is to be arranged below a corresponding door opening of a motor vehicle body, which cladding element can be displaced between a cladding position, which the cladding element assumes when the vehicle is in driving mode, and a release position, which the cladding element is to assume in particular during entry and exit of the motor vehicle. This already known cladding device can thus generally solve the problem of, on the one hand, sufficiently covering a lower edge of a respective side door in the transverse direction of the vehicle or at least being flush with it in order to guarantee appropriate protection against corrosion and dirt, and on the other hand, simplifying getting into and out of the vehicle by displacing the cladding element.

A side cladding for a passenger vehicle which covers a region of a lateral longitudinal member arises from DE 36 13 301 A1. For this purpose, the side cladding is made of a dimensionally stable plastic material which ensures the inherent rigidity of the finished side cladding. In order to be able to extend the side cladding fixed to the longitudinal member at its longitudinal edge regions from a position of non-use into an aerodynamically favorable functional position in which the central region of the side cladding is exposed outwards, the side cladding is provided in its region close to the road with target bending points each forming a joint, which in particular also enable the side cladding to be folded in or into one another in its position of non-use.

From DE 10 2012 018 284 A1, a longitudinal member cladding for motor vehicles arises, which comprises a cladding element made of a flexible material which is wound on a winding shaft at one end and is fastened at the other end to an immovable, inherently rigid part of the longitudinal member cladding forming an outer wall. The flexible cladding element can be displaced by means of an adjusting device having a support contour for the cladding element into a position in which the flexible cladding element projects laterally beyond the outer wall of the longitudinal member cladding.

The object of the present invention is to create a cladding device and a method for operating such a cladding device of the aforementioned type which are optimized with regard to their so-called NVH behavior (Noise Vibration Harshness) and with regard to soiling.

In order to create a cladding device which is optimized with regard to its NVH behavior (noise, vibration and harshness behavior) and with regard to soiling, it is provided in accordance with the invention that a flexible cladding element is provided, one end of which is arranged at least indirectly on the inherently rigid cladding element and is moveable with the inherently rigid cladding element during a displacement movement between the cladding position and the release position, in that, when the outer cladding element is arranged in the cladding position, the flexible cladding element is arranged in a region of the side sill covered by a vehicle door associated with the door opening, and in that, when the outer cladding element is arranged in the cladding position, a gap between the end of the inherently rigid outer cladding element, which end has the flexible cladding element, and another component is covered. The flexible cladding element thus makes it possible to compensate for a distance between the corresponding end of the inherently rigid cladding element on the one hand and, for example, another cladding element on the other hand, which changes in the course of the displacement movement of the inherently rigid cladding element, by means of the flexible cladding element. The flexible cladding element can thus be used, for example, when the motor vehicle is in the driving mode, to cover a corresponding gap, clearance or similar between the corresponding end of the inherently rigid cladding element on the one hand and another component, for example a further cladding element, on the other hand, and thus suppress undesirable noises, vibrations or harshness which would otherwise be perceptible in the interior of the motor vehicle. A further advantage of the flexible cladding element is, moreover, that, for example, a space as a result of the displacement movement of the inherently rigid cladding element between its one end and another component, for example a further cladding element, which is connected to the flexible cladding element, is to be covered and thus, on the one hand, soiling in the region of the cladding device can be avoided, which could, for example, disturb the operational safety during the displacement movement of the inherently rigid cladding element, and on the other hand to prevent corresponding soiling of, for example, the seat occupant by contact with internal components, for example drive components, of the inherently rigid cladding device.

The flexible cladding element can be primarily designed as a fabric or a fabric panel, but can also be designed as a film or a similar other kind of surface element. Likewise, a flexible cladding element would also be conceivable from a plurality of lamellae or the like which are displaceable relative to one another or telescopically shiftable relative to one another. In the case of a fabric or a fabric panel, a material normally used for a soft top of a convertible is particularly suitable.

In a further embodiment of the invention, a free space between the inherently rigid cladding element located in the cladding position and a further cladding element, in particular an interior cladding element, or a body element is covered by the flexible cladding element. In particular in the cladding position, the free space arises, which must then be covered accordingly by the flexible cladding element. In this case, the flexible cladding element is at least slightly tensioned or similarly fixed, for example, in order to ensure sufficient coverage.

A further advantageous embodiment of the invention provides that the inherently rigid cladding element is assigned a strip element, in particular an angle strip element, to which the associated end of the flexible cladding element is attached. By means of such a strip element or angle strip element, it is possible to achieve in a particularly simple manner an overlapping of the lower edge of the associated side door by means of the cladding element.

In this context, it has proved to be further advantageous if the strip element, in particular the angle strip element, can be displaced between a cladding position, which it assumes in the cladding position of the inherently rigid cladding element, and a release position, which it assumes in the release position of the inherently rigid cladding element. By displacing the strip element, in particular the angle strip element, this can thus be brought out of overlap with the lower edge of the associated side door. Thus, the cladding element having the strip element or angle strip element can be displaced, for example, in conjunction with a displacement movement of the side door, without it resulting in collisions between the components involved. In addition, the inherently rigid cladding element can be displaced over a large displacement path.

A further advantageous embodiment provides that the strip element, in particular the angle strip element, is pivotably mourned on the inherently rigid cladding element. Such a pivot mounting is particularly reliable in operation and particularly suitable for bringing the strip element or the angle strip element outside the overlap with the lower edge of the corresponding side door.

In a further design of the invention, it has been shown to be advantageous if the inherently rigid cladding element can be displaced inwards from the cladding position to the release position in the transverse direction of the vehicle, at least with a partial region, for example an upper partial region. In this way, getting into and out of the vehicle can be made significantly easier for a vehicle occupant.

In a further design of the invention, the flexible cladding element in the cladding position is arranged in a region of the side sill which is at least partially covered by an associated vehicle door. The flexible cladding element ensures that no dirt or the like can penetrate into the free space between the inherently rigid cladding element located in the cladding position and another component, for example an interior cladding element or a body element, or that no noise or the like can enter the interior of the vehicle from this free space.

A further advantageous embodiment of the invention provides that the strip element, in particular the angle strip element, has a receiving recess for a lower door edge of an associated vehicle door. This allows a particularly protected and aerodynamic covering of the lower edge of the vehicle door.

The advantages mentioned above in connection with the cladding device according to the invention apply in the same way to the method for operating such a cladding device.

An advantageous exemplary embodiment of the cladding device according to the invention is explained in more detail below with the aid of the drawings.

BRIEF DESCRIPTION OF THE DRAWINGS

FIG. 7 is a cross-sectional view through the cladding device according to FIGS. 2 to 6, wherein the inherently rigid outer cladding element is shown in the cladding position and a flexible cladding element is provided, one end of which is arranged on the inherently rigid cladding element by means of an angle strip element, and another end of the flexible cladding element is arranged on a body element; and FIG. 8 is a sectional view through the cladding device analogous to FIG. 7, wherein the inherently rigid outer cladding element is arranged in the release position and thus the flexible cladding element is also displaced accordingly.

DETAILED DESCRIPTION OF THE DRAWINGS

Figure 1:
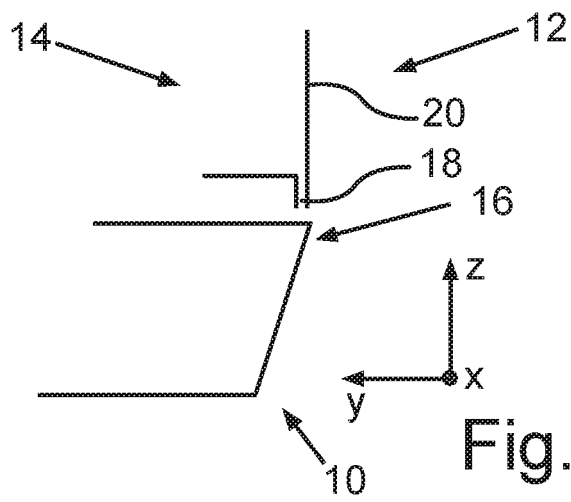
FIG. 1 is an extremely schematic sectional view through a side sill and a side door of a passenger vehicle along a sectional plane extending in the transverse direction of the vehicle or in the vertical direction of the vehicle, wherein an outer sill cladding of the side sill is arranged in the transverse direction of the vehicle to overlap or be flush with the associated lower edge of the side door.

FIG. 1 depicts, in an extremely schematic sectional view along a vehicle vertical direction (z-direction) or a sectional plane running in the transverse direction (y-direction) of the vehicle, a sill cladding for a side sill 10, not depicted in more detail, of a passenger vehicle and a side door 12 arranged above it, which is identifiable in sections, for closing a corresponding door opening 14. It can be seen here that an outer side sill cladding 16 extends outwards in the transverse direction of the vehicle (y-direction) to such an extent that—when the side door 12 is in the closed state—it protrudes beyond an associated lower door edge 18 or an outer cladding 20 of the side door 12 or is at least flush with it. Such an extension of the outer side sill cladding 16 has the advantage that, due to the overlap of the lower door edge 18 or the entire side door 12 on the underside—in relation to the transverse direction of the vehicle (y-direction)—damage due to stone chipping or general soiling of the lower door edge 18 or an entire lower region of the side door 12 can be avoided.

However, the general design of the described side sill 10 or in particular the outer side sill cladding 16 raises the problem of making it difficult to get in and out of the vehicle via the door opening 14, in particular for older people or people with reduced mobility. The problem is exacerbated if, for example, the vehicle door 12 cannot be opened wide enough in tight parking spaces. In such situations, in particular, it can result in it being uncomfortable to get in and out of the vehicle or associated soiling of clothes, in particular trouser legs or the like.

For this reason, in the present case a cladding device is provided, which is depicted in the following on the basis of FIGS. 2 to 6 in the respective perspective view and in FIGS. 7 to 8 in the respective sectional views along a sectional plane running in the vertical direction (z-direction) or in the transverse direction (y-direction) of the vehicle.

Here, in FIGS. 2 to 6, the outer side sill cladding 16 explained in connection with FIG. 1 can firstly be seen, the side sill cladding being formed, for example, from a dimensionally stable plastic and by means of which a side sill part on the body shell side which is not further recognisable is covered or overlapped towards the outside or towards the bottom, i.e. in the transverse direction of the vehicle (y-direction) and in the vertical direction of the vehicle (z-direction).

Figure 2:
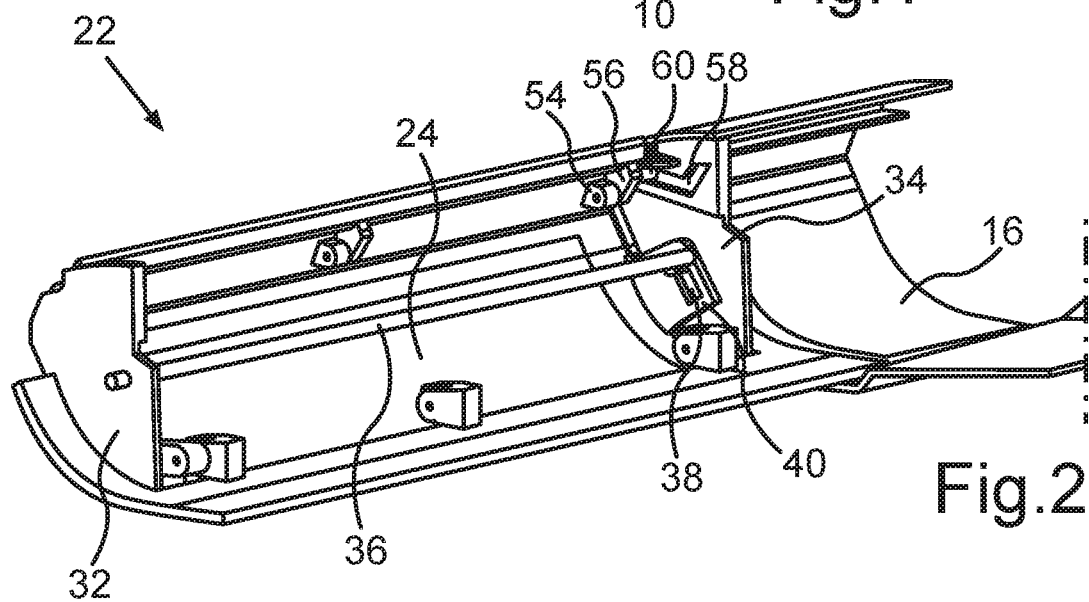
FIG. 2, in a perspective depiction, illustrates an exemplary embodiment of the cladding device in accordance with the invention for a side sill of a passenger vehicle having an inherently rigid outer cladding element which—in the state completely assembled on the vehicle—is arranged in a longitudinal region of the side sill below a door opening and which is arranged, in the present case, in a cladding position, from which it can be displaced into a release position.
Figure 3:
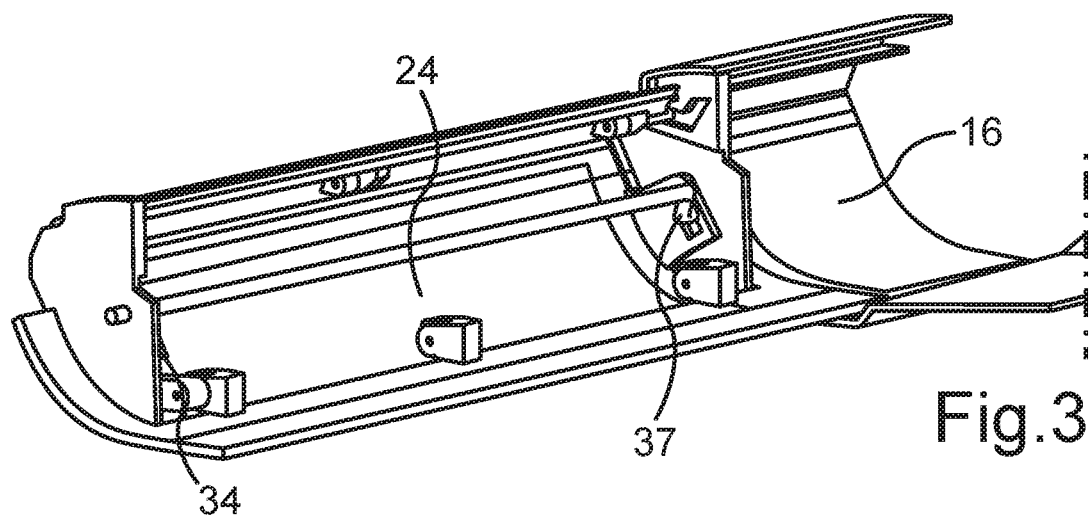
FIG. 3 is a perspective view of the cladding device analogous to FIG. 2, wherein the cladding element is shown in an initial position of its displacement movement from the cladding position to the release position.
Figure 4:
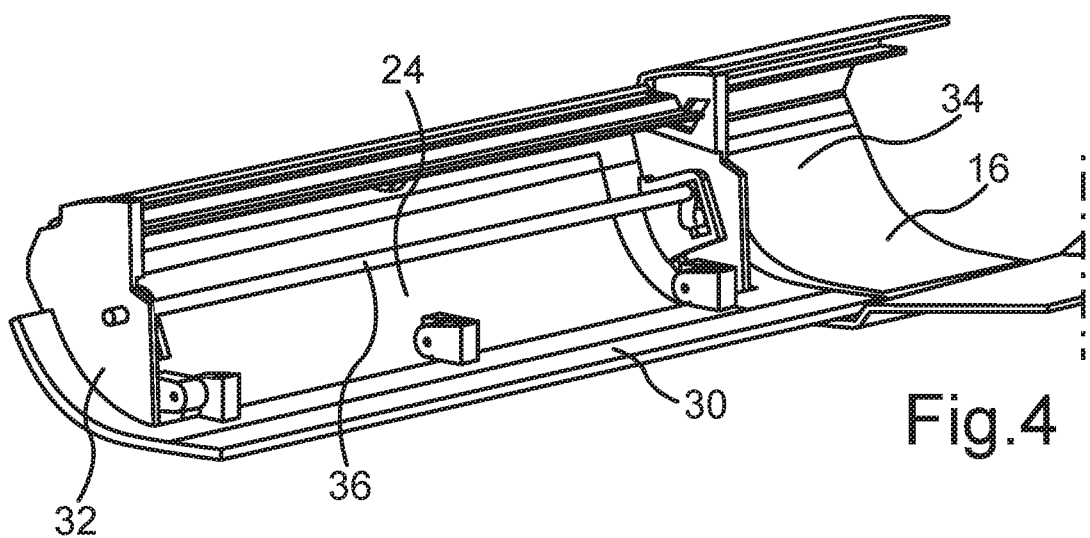
FIG. 4 is a perspective view of the cladding device according to FIGS. 2 and 3 in the further course of the displacement movement of the outer cladding element from the cladding position to the release position.
Figure 5:
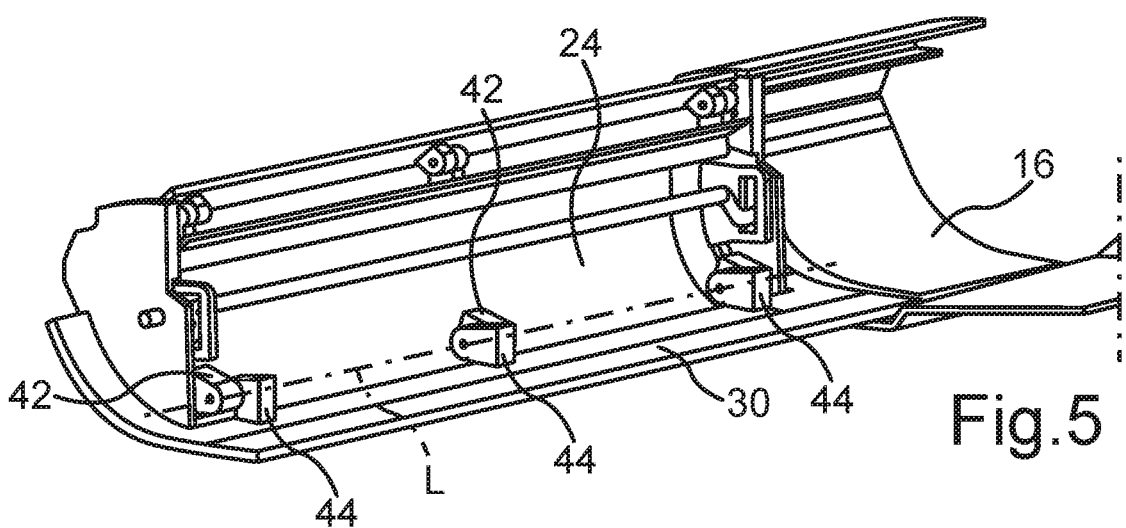
FIG. 5 is a perspective view of the cladding device analogous to FIGS. 2 to 4, wherein the cladding element is depicted shortly before reaching the release position.
Figure 6:
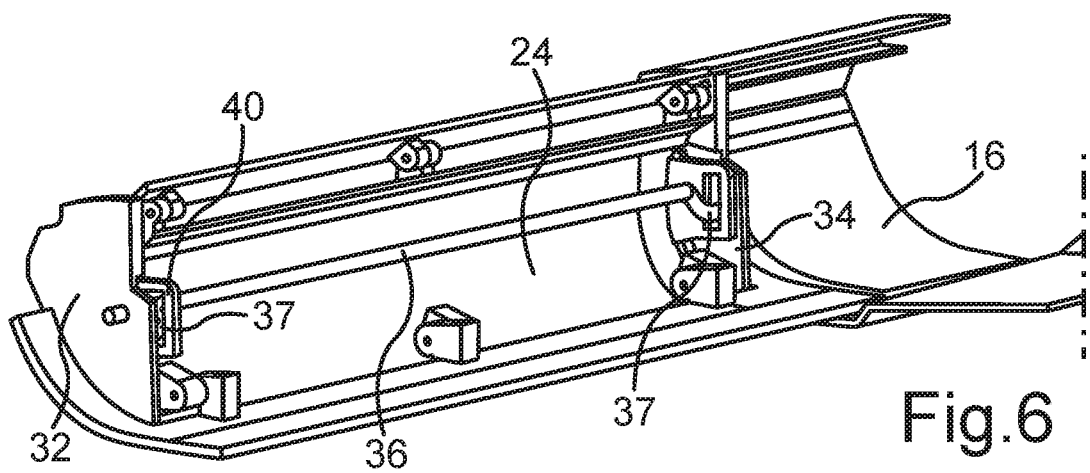
FIG. 6 is a perspective view of the cladding device according to FIGS. 2 to 5, wherein the outer cladding element is depicted after reaching the release position.

In a longitudinal region 22 of the side sill 10, which is located below the door opening 14, an inherently rigid, outer cladding element 24 is provided in the present case, which can be displaced between a cladding position recognisable in FIG. 2 and a release position recognisable in FIG. 6 in the manner described in more detail below. FIGS. 3 to 5 show intermediate positions of the cladding element 24, which it assumes during its displacement movement between the cladding position (FIG. 1) and the release position (FIG. 6). Via this, FIGS. 7 and 8 show the cladding element 24 in its two end positions, namely the cladding position in FIG. 7 and the release position in FIG. 8.

As can be seen in particular in the combination of FIGS. 7 and 8, the inherently rigid cladding element 24 can be pivoted about a bearing axis L running in the direction of extension or at least substantially in the longitudinal direction of the vehicle (x-direction), which is located in a lower region 26 of the cladding element 24. Correspondingly, it can also be seen, in particular when FIGS. 7 and 8 are viewed together, that a displacement of the cladding element 24 from the cladding position (FIG. 7) into the release position (FIG. 8) results in the cladding element 24 being displaced inwards in the transverse direction (y-direction) of the vehicle over the at least approximately entre height of the side sill 10 or the outer side sill cladding 16, in order to make it easier for a passenger to get in and out via the corresponding door opening 14. In addition, it can be seen in particular from FIG. 8 that an upper partial region of 28 of the cladding element 24 is displaced towards the center of the vehicle until it at least approximately comes into contact with a body element 63, which in the present case is a section of a body side wall which, in the region of the side sill 10, at least partially covers the latter from above and, where applicable, on its outside. Instead of the body element 63, it can also be an interior cladding element which covers the part of the side sill 10 on the body side from the vehicle interior.

As can be seen in particular from FIGS. 2 to 6, the cladding device comprises a cladding part 30 which is approximately U-shaped in its base area and in which the cladding element 24 is integrated at least substantially flush with the surface in its cladding position. This cladding part 30 is thereby arranged overlapping with the front outer side sill cladding 16 shown here and a rear outer side sill cladding not shown, wherein the cladding device is arranged in the longitudinal region 22 below the associated door opening 14 of the corresponding side door 12.

From the cladding part 30, respective bearing webs 32, 34 protrude at the front and rear side of the cladding element 24, which extend at least substantially in the vertical direction of the vehicle (z-direction) and in the transverse direction of the vehicle (y-direction). A drive rod 36 is rotatably mounted on these bearing webs 32, 34, the drive rod extending at least substantially in the longitudinal direction of the vehicle (x-direction) and approximately horizontally. This drive rod 36 comprises, in its respective end regions close to the bearing webs 32, 34, a corresponding U-shaped crank 37, which engages with an associated, slot-shaped link 38 of a corresponding link element 40, which in turn is fastened on the inside of the cladding element 24 at its front or rear end. Consequently, a rotation of the drive rod 36 causes the desired displacement movement of the cladding element 24 between the cladding position according to FIGS. 2 and 7 and the release position according to FIGS. 6 and 8 around the bearing axis L due to the interaction of the respective crank 37 with the corresponding link 38 of the corresponding link element 40.

Furthermore, it can be seen from FIGS. 2 to 6 that the bearing axis L of the cladding element 24 is formed in the present case by respective bearing elements 42, 44, which are fastened on the one hand on the inside of the cladding element 24 and on the other hand on the inside of the cladding part 30. Each of these pairs of bearing elements 42, 44 is connected to one another in a pivotable manner by a pin or similar, Wherein the pins of these pairs of bearing elements 42, 44 form the bearing axis L of the cladding element 24.

As can also be seen in particular from FIGS. 7 and 8, an angle strip element 46 is held in a displaceable manner on the upper end region 27 of the cladding element 24, which in the cladding position according to FIG. 7 extends along an upper end edge 48 of the cladding element 24 and which is also displaced in a positively controlled manner during the displacement movement of the cladding element 24 from the cladding position into the release position—and back—into its release position according to FIG. 8 in the manner described in more detail below. In the cladding position according to FIG. 7, the angle strip element 46 is accordingly arranged on the upper side of the cladding element 24 and extends with one leg 50 horizontally and outwards in the transverse direction of the vehicle (y-direction) and with one leg 52 at least substantially vertically and upwards in the vertical direction of the vehicle (z-direction).

In the release position according to FIG. 8, the angle strip element 46 is arranged substantially below the upper end region 28 of the cladding element 24, wherein the leg 52 extends downwards in the vehicle vertical direction (z-direction) and the leg 50 extends inwards in the vehicle transverse direction (y-direction).

The displacement movement of the angle strip element 46 between its two end positions—the release position and the cladding position—is positively controlled by the displacement movement of the cladding element 24. Here, the angle strip element 46 can be displaced around a bearing axis W via respective bearing elements 54, 56, which are arranged on the inside of the cladding element 24 or on the inside of the angle strip element 46. In addition, each of the bearing webs 32, 34 comprises, on the respective inner side facing the cladding element 24, a link 58, which is approximately L-shaped in the present case and in which a bearing journal 60 of the respectively associated bearing element 56, which is connected to the angle strip element 46, is engaged. An overview of FIGS. 2 to 6 shows that the bearing journal 60 runs along the L-shaped link 58 during the displacement movement of the cladding element 24 and thus causes the displacement or pivoting movement of the angle strip element 46 from its cladding position into its release position.

Finally, it can be seen in particular from FIG. 7 that a flexible cladding element 62 is provided, one end 64 of which is arranged at least indirectly—namely in the present case by means of the angle strip element 46—on the inherently rigid cladding element 24. The other end 66 of the flexible cladding element 62 is attached to the body element 63 in the present case. According to FIG. 7, the flexible cladding element 62 thus covers a free space 68 between the inherently rigid cladding element 24 in the cladding position and the body element 63. In the present case, the flexible cladding element 62 is made of a fabric material, for example a fabric panel, as is used for convertible covers. Of course, other designs would also be conceivable here, such as a lamella-like or telescopically moveable system of several cover elements.

The flexible cladding element 62 is arranged in the cladding position in a region of the side sill 10 covered by the associated vehicle door. The flexible cladding element 62 is virtually spread out, i.e., it covers the free space 68 below it without wrinkles and thus prevents the penetration of dirt on the one hand and the inflow of air on the other hand while the vehicle is in driving operation, which could lead to disturbing noises.

The flexible cladding element 62 thus serves, among other things, to cover the free space 68, for example to prevent soiling of clothing or a free view into the free space 68. In addition, the entry of dirt into the free space 68 can also be prevented. A further advantage of the flexible cladding element 62 is that it improves the NHV behavior in the interior of the motor vehicle by preventing corresponding noises or similar which could, for example, enter the interior of the motor vehicle via the free space 68. Finally, the flexible cladding element 62 also improves the NHV behavior of the vehicle as a whole.

When viewed together with FIG. 8, it can be seen that the flexible cladding element 62 is also displaced by the displacement movement of the cladding element 24 and the angle strip element 46. Due to the flexible design of the cladding element 62, the displacement movement of the cladding element 24 and the angle strip element 46 is not hindered.

The angle strip element 46 is designed and arranged in its cladding position according to FIG. 7 in such a way that it has a recess 70 for the lower edge 18 of the associated side door 12. This ensures even better protection of the lower edge of the door 18 and improved aerodynamics of the vehicle.

By moving the angle strip element 46 between its cladding position according to FIG. 7 and its release position according to FIG. 8, it is also achieved that the cladding element 24 can be moved even before the side door 12 is opened. The kinematics of the drive rod 36 in combination with the respective links 38 in the corresponding link elements 40 is designed in such a way that in both positions the release position and the cladding position—a dead center is overcome in order to securely hold the cladding element 24 in the corresponding positions. In both cases, respective stops are provided in order to additionally secure the position.

The cladding element 24 and the angle strip element 46 can be driven, for example, by an electric motor, hydraulically or pneumatically by means of the corresponding drive of the drive rod 36. In doing so, a coupling can be coupled to the opening of the side door or the opening or closing of a vehicle locking system. Other couplings are of course also conceivable.

The invention claimed is:

1. A cladding device of a side sill of a passenger vehicle, comprising:
an inherently rigid outer cladding element disposed in a longitudinal region of the side sill below a door opening of the passenger vehicle which is displaceable between a cladding position and a release position; and
a flexible cladding element, wherein an end of the flexible cladding element is disposed at least indirectly on the inherently rigid outer cladding element and is displaceable with the inherently rigid outer cladding element during a displacement movement between the cladding position and the release position, such that the flexible cladding element changes shape between the cladding position and the release position;
wherein the flexible cladding element is disposed in a region of the side sill covered by a vehicle door of the passenger vehicle associated with the door opening when the inherently rigid outer cladding element is disposed in the cladding position;
and wherein when the inherently rigid outer cladding element is disposed in the cladding position a gap is covered between an end of the inherently rigid outer cladding element, on which is disposed the end of the flexible cladding element, and a component of the passenger vehicle.

2. The cladding device according to claim 1 further comprising a strip element mounted on the inherently rigid outer cladding element, wherein the end of the flexible cladding element is attached to the strip element.

3. The cladding device according to claim 2, wherein the strip element is displaceable between a cladding position which is assumed in the cladding position of the inherently rigid outer cladding element and a release position which is assumed in the release position of the inherently rigid outer cladding element.

4. The cladding device according to claim 3, wherein the strip element is pivotably mounted on the inherently rigid outer cladding element.

5. The cladding device according to claim 1, wherein the inherently rigid outer cladding element is displaceable inwards in a transverse direction of the passenger vehicle from the cladding position into the release position.

6. The cladding device according to claim 1, wherein the flexible cladding element in the cladding position is disposed in a region of the side sill covered by the vehicle door.

7. The cladding device according to claim 2, wherein the strip element has a receiving recess for a lower edge of the vehicle door.

8. The cladding device according to claim 1, wherein the flexible cladding element is made of a fabric material.

9. A method for operating a cladding device of a side sill of a passenger vehicle, comprising the steps of:
displacing an inherently rigid outer cladding element that is disposed in a longitudinal region of the side sill below a door opening of the passenger vehicle from a release position to a cladding position; and
displacing a flexible cladding element, wherein an end of the flexible cladding element is disposed at least indirectly on the inherently rigid outer cladding element, with the inherently rigid outer cladding element during the displacing of the inherently rigid outer cladding element from the release position to the cladding position and changing a shape of the flexible cladding element by the displacing of the flexible cladding element;

wherein in the cladding position, a gap is covered between an end of the inherently rigid outer cladding element, on which is disposed the end of the flexible cladding element, and a component of the passenger vehicle.

10. A passenger vehicle, comprising a side sill; and the cladding device according to claim 1 disposed in a region of the side sill.

* * * * *